(12) United States Patent
Wallace et al.

(10) Patent No.: US 6,613,125 B1
(45) Date of Patent: Sep. 2, 2003

(54) UTILIZATION OF MEMBRANES AND EXPANDER/COMPRESSORS IN GASIFICATION

(75) Inventors: Paul S. Wallace, Katy, TX (US); Kay Anderson Johnson, Missouri City, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/470,016

(22) Filed: Dec. 22, 1999

Related U.S. Application Data

(60) Provisional application No. 60/113,331, filed on Dec. 22, 1998.

(51) Int. Cl.⁷ .............................................. B01D 53/22
(52) U.S. Cl. ..................................... 95/55; 96/4; 96/14
(58) Field of Search ................................ 95/45, 55, 56; 96/4, 10, 14; 585/250; 60/620, 621, 39.02, 39.12; 48/127.1, 197 R, 215

(56) References Cited

U.S. PATENT DOCUMENTS

| | | | |
|---|---|---|---|
| 4,099,382 A | | 7/1978 | Paull et al. .................... 60/648 |
| 4,178,758 A | | 12/1979 | Paull et al. .................... 60/648 |
| 4,938,862 A | * | 7/1990 | Visser et al. ................... 208/67 |
| 5,229,102 A | * | 7/1993 | Minet et al. .................. 423/652 |
| 5,472,986 A | | 12/1995 | van Dijk ..................... 518/705 |
| 5,599,955 A | * | 2/1997 | Vora et al. ................... 549/525 |
| 5,679,133 A | * | 10/1997 | Moll et al. ...................... 95/45 |
| 5,852,925 A | * | 12/1998 | Prasad et al. ................... 95/55 |
| 5,888,470 A | * | 3/1999 | Engler et al. ................. 423/650 |
| 6,147,126 A | * | 11/2000 | DeGeorge et al. ........... 518/715 |
| 6,179,900 B1 | * | 1/2001 | Behling et al. ................. 95/55 |

FOREIGN PATENT DOCUMENTS

| | | | |
|---|---|---|---|
| EP | 0 684 066 A2 | 11/1995 | ........... B01D/53/22 |
| EP | 0 770 576 A1 | 5/1997 | ............. C01B/3/36 |
| GB | 2 007 108 | 5/1979 | ........... B01D/53/22 |
| GB | 2 179 056 | 2/1987 | ............. C01B/3/24 |

OTHER PUBLICATIONS

*Coke Gasification Costs, Economics, & Commercial Applications*, F.G. Jahnke, J.S. Falsetti, and R.F. Wilson, National Petroleum Refiners Association, AM–96–54, 1996 NPRA Annual Meeting, Mar. 17–19, 1996, p. 4.

*Hydrogen Coproduction with Gasification From Heavy Feeds (Pitch and Coke)*, J.S. Falsetti, and R.F. Wilson, National Petroleum Refiners Association, AM–94–20, 1994 NPRA Annual Meeting, Mar. 20–22, 1994, p. 4.

*Application of Texaco Gasification Power Systems for Coproduction from Low Value Feedstocks*, J.S. Falsetti, JPI Petroleum Refining Conference '94, Oct. 12–13, 1994, p. 5.

\* cited by examiner

*Primary Examiner*—Duane Smith
*Assistant Examiner*—Jason M. Greene
(74) *Attorney, Agent, or Firm*—Howrey, Simon, Arnold & White, LLP

(57) ABSTRACT

The invention is a process to recover a high pressure hydrogen rich gas stream from synthesis gas. The synthesis gas is separated into a hydrogen-enriched permeate and a hydrogen-depleted non-permeate by use of a membrane. The permeate experiences a substantial pressure drop of between about 500 psi (23.9 KPa) to 700 psi (33.5 kPa) as it passes through the membrane. The pressure of the non-permeate gas is unchanged by the membrane. The non-permeate gas pressure is reduced to between about 200 and about 500 psi for use in a combustion turbine. The hydrogen-rich permeate is compressed to between about 800 and 3000 psi (143.6 kPa) for use in subsequent operations, i.e., for use in hydrotreating of crude oil. The non-permeate gas is expanded in a manner to provide energy which is used to compress the permeate gas.

18 Claims, No Drawings

UTILIZATION OF MEMBRANES AND EXPANDER/COMPRESSORS IN GASIFICATION

Priority of U.S. Provisional Application Ser. No. 60/113,331, filed Dec. 22, 1998 is hereby claimed.

FIELD OF THE INVENTION

This invention relates to recovery and utilization of hydrogen gas from synthesis gas.

BACKGROUND OF THE INVENTION

The production of synthesis gas from the solid and liquid carbonaceous fuels, especially coal, coke, and liquid hydrocarbon feeds, has been utilized for a considerable period of time and has recently undergone significant improvements due to the increased energy demand and the need for clean utilization of otherwise low value carbonaceous material. Synthesis gas may be produced by heating carbonaceous fuels with reactive gases, such as air or oxygen, often in the presence of steam in a gasification reactor to obtain the synthesis gas which is withdrawn from the gasification reactor.

Synthesis gas mixtures comprise carbon monoxide and hydrogen. Hydrogen is a commercially important reactant for hydrogenation reactions. The synthesis gas can also be used to generate power from otherwise environmentally unacceptable fuel sources, and as a source of feed gas for the synthesis of hydrocarbons, oxygen-containing organic compounds or ammonia.

Other materials often found in the synthesis gas include hydrogen sulfide, carbon dioxide, anmmonia, cyanides, and particulates in the form of carbon and trace metals. The extent of the contaminants in the feed is determined by the type of feed and the particular gasification process utilized as well as the operating conditions. In any event, the removal of these contaminants is critical to make gasification a viable process. As the product gas is discharged from the gasifier, it is usually subjected to a cooling and cleaning operation involving a scrubbing technique wherein the gas is introduced into a scrubber and contacted with a water spray which cools the gas and removes particulates and ionic constituents from the synthesis gas. The initially cooled gas may then be treated to desulfurize the gas prior to utilization of the synthesis gas.

When the most desired product is hydrogen, the synthesis gas from the gasifier is advantageously further processed by water-shifting, also called steam reforming, using catalyst to form hydrogen from carbon monoxide as shown below:

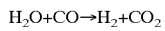

The water shift process, or steam reforming, converts water and carbon monoxide to hydrogen and carbon dioxide. The shift process is described in, for example, U.S. Pat. No. 5,472,986, the disclosure of which is incorporated herein by reference.

The hydrogen gas is often used in subsequent refining processes, particularly hydrotreating. For many applications, especially for hydrotreating hydrocarbons, the hydrogen is required at higher purity than is available in synthesis gas or even water shifted synthesis gas, and at pressures between about 1000 psi (47.9 kPa) and about 3000 psi (143.6 kPa). The shifted or unshifted synthesis gas must therefore be purified to meet product specifications. In addition, the purified gas may need to be further compressed.

Relatively pure hydrogen at high pressure can be obtained from synthesis gas via the pressure swing absorption process. This method is expensive and requires significant capital outlay. What is needed is an efficient and cost effective method of extracting a relatively pure high pressure hydrogen stream from synthesis gas.

SUMMARY OF THE INVENTION

The present invention is a process to recover a high pressure hydrogen rich gas stream from synthesis gas. The synthesis gas is provided at a temperature between about 10° C. and about 100° C. The synthesis gas is passed along a membrane at high pressure, typically between about 800 psi (38.3 kPa) and about 1600 psi (76.6 kPa), more typically between about 800 psi (38.3 kPa) and about 1200 psi (57.5 kPa). A hydrogen enriched gas permeates through the membrane. The permeate experiences a substantial pressure drop of between about 500 psi (23.9 KPa) to 700 psi (33.5 kPa) as it passes through the membrane. The pressure of the hydrogen-depleted non-permeate gas is unchanged by the membrane. The non-permeate gas pressure is advantageously reduced to between about 200 psi (9.58 kpa) and about 500 psi (23.0 kPa) for use in a combustion turbine by expanding the gas in an expander. The hydrogen-rich permeate is advantageously compressed to between about 800 psi (38.3 kPa) and 3000 psi (143.6 kPa) for use in subsequent operations, i.e., for use in hydrotreating of crude oil. The non-permeate gas is advantageously expanded in a manner to provide energy which is used to compress the permeate gas. It is preferred that an expander be directly coupled with a compressor.

DETAILED DESCRIPTION OF THE INVENTION

The invention involves the integration of oil refining and gasification, and more particularly the integration of solvent deasphalting, gasification, and hydrotreating. A deasphalted oil is typically separated from a heavy crude through solvent extraction. The bottoms from the extraction, the asphaltenes, are low value hydrocarbonaceous material. Such material may be advantageously gasified to generate hydrogen, power, steam, and synthesis gas for chemical production.

The deasphalted oil can easily be broken down into high-value diesel oil in a fluidized catalytic cracking unit. The deasphalted oil generally contains significant quantities of sulfur- and nitrogen-containing compounds. This deasphalted oil may also contain long chain hydrocarbons. To meet environmental regulations and product specifications, as well as to extend the life of the catalyst, the fluidized catalytic cracking unit feed, i.e., the deasphalted oil, is hydrotreated first to remove sulfur components.

Hydrotreating advantageously utilizes hydrogen that is generated by the gasification unit. This invention concerns a new configuration for the integration of gasification and hydrotreating that is more cost effective that conventional hydrotreating processes.

The integration of gasification and hydrotreating employs a process to recover a high pressure hydrogen rich gas stream from synthesis gas. The hydrogen rich gas stream can also be used for many other purposes. A commercially important use is hydrotreating, also called hydrocracking, of liquid hydrocarbons.

Hydrogen is extracted from synthesis gas using a membrane. A membrane allows small molecules like hydrogen to pass through (permeate) while the larger molecules ($CO_2$, $CO$) do not permeate. Membranes are a cost effective alternative to a pressure swing absorption unit. However, the membranes have two flaws. They make a large non-permeate steam that must be utilized economically for the process to be cost effective. The membranes reduce the pressure of the product hydrogen so it has to be compressed prior to use. For example, the product hydrogen pressure when purified using a membrane is substantially lower than is required by hydrotreaters. Therefore, hydrogen compressors have been added at significant capital and operating cost. This hydrogen so extracted is make-up hydrogen for the hydrotreater. The hydrogen reacts with the hydrocarbon mixture.

As used herein, the term "synthesis gas" refers to gases comprising both hydrogen gas and carbon monoxide gas. The mole ratio of hydrogen to carbon monoxide may, but need not necessarily, be about one to one. There are often some inerts in the synthesis gas, particularly nitrogen and carbon dioxide. There are often other contaminants present, such as hydrogen sulfide and COS.

The synthesis gas is prepared by partially burning a hydrocarbonaceous fuel and oxygen in a reactor, often in the presence of steam, in proportions producing a mixture containing carbon monoxide and hydrogen in the reactor.

The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". Solid, gaseous, and liquid feeds may be mixed and used simultaneously; and these may include paraffinic, olefinic, acetylenic, naphthenic, asphaltic, and aromatic compounds in any proportion. Also included within the definition of the term "hydrocarbonaceous" are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The term "liquid hydrocarbon" as used herein is intended to include various materials, such as crude oil, petroleum distillates and residue, gasoline, naphtha, kerosene, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

"Gaseous hydrocarbons," as used herein to describe suitable-gaseous feedstocks, include methane, ethane, propane, butane, pentane, natural gas, coke-oven gas, refinery gas, acetylene tail gas, ethylene off-gas, and mixtures thereof.

"Solid hydrocarbon fuels," as used herein to describe suitable solid feedstocks, include, coal in the form of anthracite, bituminous, subbituminous; lignite; coke; residue derived from coal liquefaction; peat; oil shale; tar sands; petroleum coke; pitch; particulate carbon (soot or ash); solid carbon-containing waste materials, such as sewage; and mixtures thereof. Certain types of hydrocarbonaceous fuels, in particular coal and petroleum coke, generate high levels of ash and molten slag.

It is often advantageous to mix feeds. One particularly important hydrocarbonaceous fuel is asphaltenes separated by solvent extraction from a heavy crude or other asphaltene-containing liquid hydrocarbon.

The hydrocarbonaceous fuels are reacted with a reactive oxygen-containing gas, such as air, substantially pure oxygen having greater than about 90 mole percent oxygen, or oxygen enriched air having greater than about 21 mole percent oxygen. Substantially pure oxygen is preferred. The partial oxidation of the hydrocarbonaceous material is completed, optionally in the presence of a temperature control moderator such as steam, in a gasification zone to obtain the hot partial oxidation synthesis gas.

The proportion of oxygen to hydrocarbon should be sufficient to avoid by-product soot formation. There can, however, be formation of carbon in small quantities and in a finely divided state such that it does not constitute a by-product and does not adversely affect any processing steps.

Synthesis gas can be manufactured by any partial oxidation method. Typically, the synthesis gas is manufactured in a partial oxidation, or gasification, reactor wherein hydrocarbonaceous fuels are reacted with oxygen to create hydrogen and carbon monoxide. Preferably, the gasification process utilizes substantially pure oxygen with above about 95 mole percent oxygen. The gasification processes are known to the art. See, for example, U.S. Pat. No. 4,099,382 and U.S. Pat. No. 4,178,758, the disclosures of which are incorporated herein by reference.

In the gasification reactor, the hydrocarbonaceous fuel is contacted with a free-oxygen containing gas, optionally in the presence of a temperature moderator. In the reaction zone, the contents will commonly reach temperatures in the range of about 1,700° F. (926° C.) to 3,000° F. (1649° C.), and more typically in the range of about 2,000° F. (1093° C.) to 2,800° F. (1537° C.). Pressure will typically be in the range of about 1 to about 250 atmospheres, and more typically in the range of about 15 atmospheres (101 Pa) to about 150 atmospheres (25.3 kPa), and even more typically in the range of about 60 atmospheres (6.08 kPa) to about 80 atmospheres (8.12 kPa).

The gas is cooled and washed of contaminants, preferably with energy recovery such as by steam raising and/or steam superheating. There may follow lower grade heat recoveries, as in conventional synthesis gas manufacturing. There may be conventional steps of steam removal and, where appropriate, of composition adjustment.

If hydrogen gas is a desired product, it is advantageous to subject the synthesis gas to steam reforming to increase the relative yield of hydrogen gas. Steam reforming is a process of adding water, or using water contained in the gas, and reacting the resulting gas mixture adiabatically over a steam reforming catalyst. The purpose of steam reforming is to increase the amount of hydrogen in the gas mixture.

The synthesis gas composition of a gasification reaction is typically hydrogen gas at 25 to 45 mole percent; carbon monoxide gas at 40 to 50 mole percent; carbon dioxide gas at 10 to 35 mole percent; and trace contaminants. In a steam reformed synthesis gas a typical composition is hydrogen gas at 35 to 65 mole percent; carbon monoxide gas at 10 to 20 mole percent; carbon dioxide gas at 30 to 60 mole percent; and trace contaminants. These ranges are not absolute, but rather change with the fuel gasified as well as with gasification parameters.

The steam reforming catalyst can be one or more Group VIII metals on a heat resistant support. Conventional random packed ceramic supported catalyst pieces, as used for example in secondary reformers, can be used but, since these apply a significant pressure drop to the gas, it is often advantageous to use a monolithic catalyst having through-passages generally parallel to the direction of reactants flow.

The gas temperature typically is in the range 750° C. to 1050° C. A preferred shift reaction is a sour shift, where there is almost no methane and the shift reaction is exothermic.

Contaminants in the gas, especially sulfur compounds and acid gases, can be readily removed. The synthesis gas contains hydrogen sulfide ($H_2S$) and COS formed from sulfur in the feed to the gasifier. The COS is shifted in the steam reformer following the same reaction path as carbon monoxide to form hydrogen sulfide and carbon dioxide.

The hydrogen sulfide, an acid gas, is easily removed from the synthesis gas. Convention amine solvents, such as MDEA, can be used to remove the hydrogen sulfide. Physical solvents such as SELEXOL and RECTIXOL can also be used. The physical solvents are typically used because they operate better at high pressure. The synthesis gas is contacted with the solvent in an acid gas removal contactor. Said contactor may be of any type known to the art, including trays or a packed column. Operation of such a acid removal contactor is known in the art.

It is preferred that the design and operation of the shift reactor result in a minimum of pressure drop. The pressure of the synthesis gas is therefore preserved, and the sulfur removal can be accomplished prior to further hydrogen purification steps or utilization of the hydrogen.

In hydrotreating and hydrocracking operations, hydrogen is contacted with hydrocarbons in the presence of a catalyst. The catalyst facilitated the breaking of carbon-carbon, carbon-sulfur, carbon-nitrogen, and carbon-oxygen bonds and the bonding with hydrogen. The purpose of this operation is to increase the value of the hydrocarbon stream by removing sulfur, reducing acidity, and creating shorter hydrocarbon molecules.

Hydrotreating requires a hydrogen-rich gas comprising greater than about 80 mole percent of hydrogen gas.

The synthesis gas or mixed synthesis gas-purge gas stream is therefore separated into a hydrogen-rich gas stream and a hydrogen-depleted gas stream. Membranes are a preferred alternative to a pressure swing absorption unit.

The membrane can be of any type which is preferential for permeation of hydrogen gas over carbon dioxide and carbon monoxide. Many types of membrane materials are known in the art which are highly preferential for diffusion of hydrogen compared to nitrogen. Such membrane materials include those composed of silicon rubber, butyl rubber, polycarbonate, poly(phenylene oxide), nylon 6,6, polystyrenes, polysulfones, polyamides, polyimides, polyethers, polyarylene oxides, polyurethanes, polyesters, and the like. The membrane units may be of any conventional construction, and a hollow fiber type construction is preferred.

The membranes reduce the pressure of the hydrogen-enriched stream so it has to be compressed prior to use. The synthesis gas or mixed gas stream enters the membrane at high pressure, typically between about 800 (38.3 kPa) and about 1600 psi (76.6 kPa), more typically between about 800 psi (38.3 kPa) and about 1200 psi (57.5 kPa). The gas temperature is typically between about 10° C. to about 100° C., more typically between about 20° C. and about 50° C. A membrane allows small molecules like hydrogen to pass through (permeate) while the larger molecule ($CO_2$, CO) do not pass through (non-permeate). The permeate experiences a substantial pressure drop of between about 500 psi (23.9 KPa) to 700 psi (33.5 kPa) as it passes through the membrane. The hydrogen-rich permeate is therefor typically at a pressure of from about 100 psi (4.78 kPa) to about 700 psi (33.5 kPa), more typically between about 300 psi (14.3 kPa) to about 600 psi (28.7 kPa). The permeate may contain between about 85 to about 98 mole percent hydrogen gas. The hydrogen rich permeate must be compressed to be used in, for example, a hydrotreater or hydrocracker.

The non-permeate has negligible pressure drop in the membrane unit. The non-permeate gas stream from the membrane contains carbon dioxide, carbon monoxide, and some hydrogen. Other compounds, in particular volatile hydrocarbons and inerts, may also be present. This non-permeate makes a good fuel for combustion turbines. The pressure of this permeate is advantageously reduced prior to burning in a combustion turbine.

An expander/compressor is used to simultaneously increase the hydrogen pressure and to reduce the non-permeate gas pressure. The number of moles of the non-permeate is typically between about one and about five times the number of moles of the permeate. The non-permeate is at high pressure and the pressure should be lowered for eventual use as combustion turbine fuel gas. The combustion turbine requires a pressure of from about 200 psi (9.57 kPa) to about 500 psi (23.9 kPa), more typically from about 300 psi (14.3 kPa) to about 400 psi (19.1 kPa), for its feeds. The hydrogen-rich permeate is at low pressure and the pressure should be increased for eventual use in, for example, a hydrotreater. The hydrogen-rich permeate is usually required at from about 1000 psi (47.8 kPa) to about 3000 psi (143.6 kPa), more typically from about 1000 psi (47.9 kPa) to about 1500 psi (71.8 kPa). The expander/compressor has an expander in which the non-permeate expands, which directly drives a compressor which compresses the permeate. No motor is required.

The mass flow between the non-permeate expanding through the compressor and the permeate being compressed in the compressor must be controlled. The compressor and expanders may be turbine, pistons, or any other design known to the art. In any event, the mass throughput through the compressor and expander must balance the compression and expansion pressure ratios. There may also be mechanical limitations.

For a turbine compressor/turbine expander, any changes in mass flow there between must not exceed the design of the gas turbine thrust bearing. Under typical designs, there may be a maximum of 10% variation in relative mass flow through the expander side than that flowing through the compressor side. At the same time, it is recognized that the required flow rates may vary by a factor of more than ten, i.e., from about 10 to about 400 million standard cubic feet per day (about 283 to about 11362 million liters per day) for a typical facility. Nevertheless, the relationship between throughput and compression ratios is well understood. It is therefore within the skill of one skilled in the art, with the benefit of this disclosure, to size the expander and compressor system.

The hydrogen-rich permeate may be further compressed as needed to reach the appropriate pressure level required by a given end-use.

If the end-use is as make-up gas for a hydrotreater, then the hydrogen is advantageously mixed with recycled hydrogen from the hydrotreater that has been compressed to the appropriate pressure. Hydrotreating is an exothermic reaction, but the reactants must be preheated to initiate the reaction. During the hydrotreating process, hydrogen sulfide and short chain hydrocarbons such as methane, ethane, propane, butane and pentane are formed. The hydrogen is recycled to the hydrotreater, and a small purge stream is taken. The purge prevents non-condensables such as hydrogen sulfide, methane, and ethane from building up in the process which would inhibit the reaction.

In one embodiment of this invention, the purge gas is advantageously routed to the gasification unit acid gas removal unit. The purge gas is mixed with synthesis gas. There the impurities are removed from the purge gas/synthesis gas mixture. A hydrogen rich permeate is recovered via the membrane separator, is compressed in an expander/compressor, and is recycled back to the hydrotreater.

Membranes are only partially effective at removing hydrogen gas from the synthesis gas stream. This is not considered a detriment. Typically, hydrotreating requires less than one half of the hydrogen gas generated by gasifying hydrocarbons.

The large non-permeate gas stream must be utilized in a commercially viable process. While this non-permeate gas may be burned in boilers or other heat generating processes, this gas is advantageously burned in a combustion turbine. Therefore, the combustible impurities are routed to a pressurized fuel gas system typically used for a combustion turbine.

A combustion turbine advantageously burns the pressurized non-permeate gas from the membrane and generates power from the expansion turbine. A combustion turbine is a particularly effective method of generating power from pressurized fuel gas. The non-permeate gas must have sufficient composition to support combustion in the combustion turbine. This non-permeate gas is a high carbon dioxide, low BTU content gas. This gas may be mixed with other gases, but such other gases may not be available.

The faster burning material in the non-permeate gas stream is hydrogen. A considerable fraction of the heating value of such gas with very low heating value is provided by hydrogen. The fast burning hydrogen elevates the temperature of the flame considerably in relatively little space, whereupon the other combustibles of the low heating value fuel burn properly. Especially when hydrogen has been burned already, and the gas temperature has therefore been increased, the CO present in the non-permeate gas will then burn quickly. It is essential to have high gas temperature to efficiently combust hydrocarbons present. Therefore, the hydrogen percentage in the non permeate must meet the requirements of the combustion turbine supplier, usually between 5 and 25%.

In one embodiment of this invention, at least a fraction of the energy from the combustion turbine is also used to compress the hydrogen-rich permeate.

Upon review of the above disclosure one of ordinary skill in the art should understand that one illustrative embodiment of the present invention includes a process of manufacturing a high pressure hydrogen-enriched gas stream. Such an illustrative process includes: a) providing a synthesis gas, such that the synthesis gas has a pressure between about 800 psi (38.3 kPa) and about 1600 psi (76.6 kPa), and a temperature between about 10° C. to about 100° C.; b) passing the synthesis gas along a membrane such that a hydrogen-enriched gas permeates through the membrane, thereby creating a hydrogen-depleted non-permeate and a hydrogen-rich permeate at lower pressure, c) expanding the non-permeate, and d) compressing the permeate to between about 800 psi (38.3 kPa) and about 3000 psi (143.6 kPa), such that the energy for compressing the permeate is obtained from the expansion of the non-permeate.

In practicing the illustrative method it is preferred that the permeate experiences a pressure drop of between about 500 psi (23.9 kPa) to about 700 psi (33.5 kPa) as it permeates through the membrane. Similarly it is preferred that the expanded non-permeate pressure is between about 200 psi (9.58 kpa) and about 500 psi (23.9 kPa).

The process may further include reacting the compressed hydrogen-enriched permeate with a hydrocarbon mixture, preferably under a hydrotreating conditions so as to give a hydrotreated hydrocarbon. The illustrative process may also include gasifying a hydrocarbonaceous fuel to produce the synthesis gas, wherein the hydrocarbonaceous fuel comprises asphaltenes, and wherein gasifying comprises reacting the hydrocarbonaceous fuel with a gas comprising greater than about 90 mole percent oxygen such that synthesis gas is formed. It is preferred that the synthesis gas comprises between about 25 to about 45 mole percent hydrogen, about 40 to about 50 mole percent carbon monoxide, and about 10 to about 35 mole percent carbon dioxide.

One can react the synthesis gas with steam adiabatically over a steam reforming catalyst before passing the synthesis gas along a membrane. In such embodiments of the invention, the steam reformed synthesis gas should comprise between about 35 to about 65 mole percent hydrogen, about 10 to about 20 mole percent carbon monoxide, and about 30 to about 60 mole percent carbon dioxide.

The illustrative process should preferably be carried out utilizing a membrane selected from one or more of silicon rubber, butyl rubber, polycarbonate, poly(phenylene oxide), nylon 6,6, polystyrenes, polysulfones, p6 lyamides, polyimides, polyethers, polyarylene oxides, polyurethanes, and polyesters. Preferably the permeate comprises greater than about 80 mole percent hydrogen and more preferably the permeate comprises between about 85 and about 98 mole percent hydrogen.

The present illustrative process may be carried out such that the permeate pressure prior to compression is between about 100 psi (4.78 kPa) and about 700 psi 33.5 kPa). More preferably the permeate pressure prior to compression is between about 300 psi (14.3 kPa) and about 600 psi (28.7 kPa).

The number of moles of the non-permeate is preferably between about one and about five times the number of moles of the permeate when carrying out the illustrative method. The non-permeate pressure after expansion is preferably between about 200 psi (9.58 kPa) and about 500 psi (23.0 kPa). It is also preferred that the non-permeate be burned in a combustion turbine.

The compression of the permeate and the expansion of the non-permeate takes place in a compressor/expander, wherein the compressor and the expander are linked so that the expansion of the non-permeate provides the energy to compress the permeate. In such an embodiment, the compressor/expander may be two turbines or the compressor may be a turbine or a piston, and the expander may be a turbine or a piston.

While the devices, compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A process of manufacturing a high pressure hydrogen-enriched gas stream, said process comprising:

a) providing a synthesis gas, wherein the synthesis gas pressure is between about 800 psi (5516 kPa) and about 1600 psi (11032 kPa), and wherein the synthesis gas temperature is between about 10° C. to about 100° C.

b) passing the synthesis gas along a membrane such that a hydrogen-enriched gas permeates through the membrane, thereby creating a hydrogen-depleted non-permeate and a hydrogen-rich permeate at lower pressure, c) expanding the non-permeate, and d) compressing the permeate to between about 800 psi (5516 kPa) and about 3000 psi (20684 kPa), wherein the energy for compressing the permeate is obtained from the expansion of the non-permeate.

2. The process of claim 1 wherein the permeate experiences a pressure drop of between about 500 psi (3447 kPa) to about 700 psi (4826 kPa) as it permeates through the membrane.

3. The process of claim 1 wherein the expanded non-permeate pressure is between about 200 psi (1379 kPa) and about 500 psi (3447 kPa).

4. The process of claim 1 further comprising reacting the compressed hydrogen-enriched permeate with a hydrocarbon mixture.

5. The process of claim 1 further comprising gasifying a hydrocarbonaceous fuel to produce the synthesis gas, wherein the hydrocarbonaceous fuel comprises asphaltenes, and wherein gasifying comprises reacting the hydrocarbonaceous fuel with a gas comprising greater than about 90 mole percent oxygen such that synthesis gas is formed.

6. The process of claim 1 wherein the synthesis gas comprises between about 25 to about 45 mole percent hydrogen, about 40 to about 50 mole percent carbon monoxide, and about 10 to about 35 mole percent carbon dioxide.

7. The process of claim 1 further comprising reacting the synthesis gas with steam adiabatically over a steam reforming catalyst before passing the synthesis gas along a membrane.

8. The process of claim 7 wherein the steam reformed synthesis gas comprises between about 35 to about 65 mole percent hydrogen, about 10 to about 20 mole percent carbon monoxide, and about 30 to about 60 mole percent carbon dioxide.

9. The process of claim 1 wherein the membrane comprises one or more of silicon rubber, butyl rubber, polycarbonate, poly(phenylene oxide), nylon 6,6, polystyrenes, polysulfones, polyamides, polyimides, polyethers, polyarylene oxides, polyurethanes, and polyesters.

10. The process of claim 1 wherein the permeate comprises greater than about 80 mole percent hydrogen.

11. The process of claim 1 wherein the permeate comprises between about 85 and about 98 mole percent hydrogen.

12. The process of claim 1 wherein the permeate pressure prior to compression is between about 100 psi (689 kPa) and about 700 psi (4826 kPa).

13. The process of claim 1 wherein the permeate pressure prior to compression is between about 300 psi (2068 kPa) and about 600 psi (4137 kPa).

14. The process of claim 1 wherein the number of moles of the non-permeate is between about one and about five times the number of moles of the permeate.

15. The process of claim 1 wherein the non-permeate pressure after expansion is between about 200 psi (1379 kPa) and about 500 psi (3447 kPa), and further comprising burning the non-permeate in a combustion turbine.

16. The process of claim 1 wherein the compression of the permeate and the expansion of the non-permeate takes place in a compressor/expander, wherein the compressor and the expander are linked so that the expansion of the non-permeate provides the energy to compress the permeate.

17. The process of claim 16 wherein the compressor/expander comprises two turbines.

18. The process of claim 16 wherein the compressor comprises a turbine or a piston, and wherein the expander comprises a turbine or a piston.

* * * * *